US006904444B2

(12) United States Patent
Picciolo et al.

(10) Patent No.: US 6,904,444 B2
(45) Date of Patent: Jun. 7, 2005

(54) PSEUDO-MEDIAN CASCADED CANCELLER

(75) Inventors: Michael L. Picciolo, Silver Spring, MD (US); Karl Gerlach, Dunkirk, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 580 days.

(21) Appl. No.: 09/835,127

(22) Filed: Apr. 12, 2001

(65) Prior Publication Data

US 2002/0198914 A1 Dec. 26, 2002

(51) Int. Cl.$^7$ .............................................. G06F 17/10
(52) U.S. Cl. ..................................... 708/322; 708/300
(58) Field of Search ................................ 708/300–323

(56) References Cited

U.S. PATENT DOCUMENTS

| | | |
|---|---|---|
| 3,876,947 A | 4/1975 | Giraudon |
| 4,173,759 A | 11/1979 | Bakhru |
| 4,353,119 A | 10/1982 | Daniel et al. |
| 4,513,383 A | 4/1985 | Hackett, Jr. |
| 4,606,054 A * | 8/1986 | Amitay et al. ............... 375/349 |
| 4,628,320 A | 12/1986 | Downie |
| 4,719,466 A | 1/1988 | Farina et al. |
| 4,797,807 A | 1/1989 | Gerlach |
| H792 H | 6/1990 | Sanval et al. |
| 4,959,653 A | 9/1990 | Ganz |
| H1005 H | 12/1991 | Gerlach |
| H1033 H | 3/1992 | Willey et al. |
| 5,511,423 A | 4/1996 | Sugiyama et al. |
| 5,541,520 A | 7/1996 | Zai et al. |

(Continued)

OTHER PUBLICATIONS

Reed, I. S., Mallet, J. D., Brennan, L. E., "Rapid Convergence Rate in Adaptive Arrays", IEEE Trans. Aerospace and Electronic Systems, vol. AES–10, No. 6, Nov., 1974, pp. 853–863.

Antonik, P. Schuman, H. Melvin, W., Wicks, M., "Implementation of Knowledge–Based Control for Space–Time Adaptive Processing", IEEE Radar 97 Conference, Oct. 14–16, 1997, p. 478–482.

(Continued)

*Primary Examiner*—Kakali Chaki
*Assistant Examiner*—Chat C. Do
(74) *Attorney, Agent, or Firm*—John J. Karasek; Sally A. Ferrett

(57) ABSTRACT

An adaptive signal processing system utilizes a pseudo-median cascaded canceller to compute a set of complex adaptive weights and generate a filtered output signal. The system includes a plurality of building blocks arranged in a Gram-Schmidt cascaded canceller-type configuration for sequentially decorrelating input signals from each other to thereby yield a single filtered output signal. Each building block includes a local main input channel which receives a local main input signal, a local auxiliary input channel which receives a local auxiliary input signal, and a local output channel which sends a local filtered output signal. Each building block generates a complex adaptive weight which is the sample median value of the real and imaginary parts of the ratio of local main input weight training data to local auxiliary input weight training data, and each building block generates a local output signal utilizing the complex adaptive weight. The effect of non-Gaussian noise contamination on the convergence MOE of the system is negligible. In addition, when desired signal components are included in weight training data they cause little loss of noise cancellation.

22 Claims, 6 Drawing Sheets

U.S. PATENT DOCUMENTS

| | | | |
|---|---|---|---|
| 5,561,667 A | * 10/1996 | Gerlach | 370/286 |
| 5,640,429 A | 6/1997 | Michels et al. | |
| 5,694,342 A | 12/1997 | Stein | |
| 5,706,013 A | 1/1998 | Melvin et al. | |
| 5,760,734 A | 6/1998 | Urkowitz | |
| 5,790,440 A | * 8/1998 | Fujii et al. | 708/322 |
| 5,909,384 A | * 6/1999 | Tal et al. | 708/322 |
| 5,963,888 A | 10/1999 | Uhlmann et al. | |
| 6,041,290 A | 3/2000 | Matt et al. | |
| 6,044,336 A | 3/2000 | Marmarelis et al. | |
| 6,058,408 A | 5/2000 | Fischer et al. | |
| 6,121,914 A | 9/2000 | Cavelos et al. | |
| 6,124,828 A | 9/2000 | Champeau | |

OTHER PUBLICATIONS

Gerlach, K., Kretschmer, F. F., Jr., "Convergence Properties of Gram–Schmidt and SMI Adaptive Algorithms, Part II", IEEE Trans. Aerospace and Electronics Systems, vol. 27, No. 1, Jan. 1991, pp. 83–91.

Gerlach, K., Kretschmer, F. F., Jr., "Convergence Properties of Gram–Schmidt and SMI Adaptive Algorithms", IEEE Trans. Aerospace and Electronics Systems, vol. 26, No. 1, Jan. 1990, pp. 44–56.

Yuen, S. M., "Comments on Convergence Properties of Gram–Schmidt and SMI Adaptive Algorithms", IEEE Trans. Aerospace and Electronics Systems, vol. 27, No. 6, Nov. 1991, pp. 897–901.

Brennan, L. E., Reed I. S., "Digital Adaptive Arrays With Weights Computed From And Applied To The Same Sample Set", Proceedings 1980 Adaptive Antenna Symposium, Rome Air Development Center report RADC–TR–80–378, vol. 1, Dec. 1980, pp. 236–249.

* cited by examiner

PSEUDO-MEDIAN CASCADED CANCELLER

FIELD OF THE INVENTION

The invention relates in general to an adaptive signal processing system. More specifically, the invention relates to an adaptive signal processing system that utilizes a pseudo-median cascaded canceller to calculate complex adaptive weights and filter out undesired noise.

BACKGROUND OF THE INVENTION

Adaptive signal processing systems have many applications including radar reception, cellular telephones, communications systems, and biomedical imaging. Adaptive signal processing systems utilize adaptive filtering to differentiate between the desired signal and noise. An adaptive filter is defined by four aspects: the type of signals being processed, the structure that defines how the output signal of the filter is computed from its input signal, the parameters within this structure that can be iteratively changed to alter the filter's input-output relationship, and the adaptive algorithm that describes how the parameters are adjusted from one time instant to the next.

Common applications of adaptive signal processing include: an adaptive radar reception antenna array, an adaptive antenna array for adaptive communications, and adaptive sonar. In these systems, desired signal detection and estimation is hindered by noise and interference. Interference may be intentional jamming and or unintentional received radiation. These antenna arrays may change their reception patterns automatically in response to the signal environment in a way that optimizes the signal power to interference power plus noise power ratio (abbreviated as SINR). The array pattern is easily controlled by weighting the amplitude and phase of the signal from each element before combining (adding) the signals. Adaptive arrays are especially useful to protect radar and communication systems from interference when the directions of the interference are unknown or changing while attempting to receive a desired signal of known form. Adaptive arrays are capable of operating even when the antenna elements have arbitrary patterns, polarizations, and spacings. This feature is especially advantageous when an antenna array operates on an irregularly shaped surface such as an aircraft or ship.

Adaptive signal processing systems are required to filter out undesirable noise. Due to the lack of a priori knowledge of an external environment, adaptive signal processing systems require a certain amount of statistically independent weight training data samples to effectively estimate the input noise covariance matrix. The input noise covariance matrix is the set of second central moments (i.e., moments about the mean) among the received antenna element voltages.

"Ideal" weight training data has a Gaussian probability distribution for both its real and imaginary baseband components. FIG. 1 is a frequency vs. amplitude plot representing an ideal Gaussian noise source with a bell-shaped probability curve in which the mean value is identical to the median value. However, real-world weight training data may be contaminated by undesirable impulse noise outliers, resulting in a non-Gaussian distribution of real and imaginary components.

The number of weight training data samples required for signal power to interference power plus noise power ratio (SINR) performance of the adaptive processor to be within 3 dB of the optimum on average is called the convergence measure of effectiveness (MOE) of the processor. A signal is stationary if its statistical probability distribution is independent of time. For the pure statistically stationary Gaussian noise case, the convergence MOE of the conventional Sample Matrix Inversion (SMI) adaptive linear technique can be attained using approximately 2N samples for adaptive weight estimation, regardless of the input noise covariance matrix, where N is the number of degrees of freedom in the processor (i.e., the number of antenna elements or subarrays) for a spatially adaptive array processor, or N is the number of space-time channels in a space-time adaptive processing (STAP) processor). Referred to as the SMI convergence MOE, convergence within 3 dB of the optimum using approximately 2N samples for adaptive weight estimation has become the benchmark used to assess convergence rates of adaptive processors. General information regarding SMI convergence MOE may be found in Reed, I. S., Mallet, J. D., Brennan, L. E., "Rapid Convergence Rate in Adaptive Arrays", IEEE Trans. Aerospace and Electronic Systems, Vol. AES-10, No. 6, November, 1974, pp. 853–863, the disclosure of which is incorporated herein by reference.

Conventional sample matrix inversion (SMI) adaptive signal processing systems are capable of meeting this benchmark for the pure statistically stationary Gaussian noise case. If, however, the weight training data contains non-Gaussian noise outliers, the convergence MOE of the system increases to require an unworkably large number of weight training data samples. The performance degradation of the SMI algorithm in the presence of non-Gaussian distributions (outliers) can be attributed to the highly sensitive nature of input noise covariance matrix estimates to even small amounts of impulsive non-Gaussian noise that may be corrupting the dominant Gaussian noise distribution. General information regarding the sensitivity of the SMI algorithm may be found in Antonik, P. Schuman, H. Melvin, W., Wicks, M., "Implementation of Knowledge-Based Control for Space-Time Adaptive Processing", IEEE Radar 97 Conference, 14–16 Oct., 1997, p. 478–482, the disclosure of which is incorporated herein by reference.

Thus, for contaminated weight training data, convergence rate slows significantly with conventional systems. Fast convergence rates are important for several practical reasons including limited amounts of weight training data due to non-stationary noise and computational complexity involved in generating adaptive weights. In other words, the time which elapses while a conventional system is acquiring weight training data and generating adaptive weights may exceed the duration of a given non-stationary noise environment, and an adaptive weight thus generated has become obsolete prior to completion of its computation.

Most real world data does not have a purely Gaussian probability distribution due to contamination by non-Gaussian outliers. Conventional signal processors assume that the weight training data has a Gaussian distribution, and therefore they do not perform as well as theory would predict when operating with real world data. If weight training data contains desired signals that appear to be outliers, the performance is similarly degraded. In an effort to compensate for these performance problems, conventional systems employ subjective data screening techniques to remove perceived outliers from the data prior to processing. However, subjective screening is undesirable because the process is ad-hoc in nature, requires many extra processing steps, and may even degrade system performance.

It would therefore be desirable to provide an adaptive signal processing system that accommodates outlier contaminated weight training data and still produces a convergence MOE which is comparable to the above referenced benchmark for SMI systems. It would also be desirable to provide a system that significantly reduces desired signal cancellation when weight training data includes desired signal components. See generally Gerlach, K., Kretschmer, F. F., Jr., "Convergence Properties of Gram-Schmidt and SMI Adaptive Algorithms, Part II", IEEE Trans. Aerospace and Electronics Systems, Vol. 27, No. 1, January 1991, pp. 83–91, the disclosure of which is incorporated herein by reference.

SUMMARY OF THE INVENTION

The present invention provides an adaptive signal processing system that utilizes a pseudo-median cascaded canceller to compute a complex adaptive weight and generate a filtered output signal. The effect of non-Gaussian noise contamination on the convergence MOE of the system is negligible. In addition, when desired signal components are included in weight training data they cause negligible loss of noise cancellation.

In a preferred embodiment, the system and method receive a plurality of input signals corresponding to a common target signal and sequentially decorrelate the input signals to cancel the correlated noise components therefrom. The system includes a plurality of building blocks arranged in a Gram-Schmidt type cascaded canceller configuration for sequentially decorrelating each of the input signals from each other of the input signals to thereby yield a single filtered output signal. Each building block includes a local main input channel which receives a main input signal, a local auxiliary input channel which receives an auxiliary input signal, and a local output channel which sends a filtered output signal. Each building block generates a complex adaptive weight whose real and imaginary parts are found by taking the sample median value of the ratio of local main input weight training data to local auxiliary input weight training data for the real and imaginary parts separately. That is, each building block generates a complex adaptive weight, $w_{med}$, by solving the equation:

$$w_{med} = \underset{k=1 \text{ to } K}{MED}\left[\text{real}\left(\frac{z(k)^*}{x(k)^*}\right)\right] + j\left\{\underset{k=1 \text{ to } K}{MED}\left[\text{imag}\left(\frac{z(k)^*}{x(k)^*}\right)\right]\right\}$$

where K is the number of weight training data samples, z is the local main input signal, *means "complex conjugate", and x is the local auxiliary input signal. The number of weight training data samples K should be odd for a true median value. K may be even, but if so, then MED refers to a numerical approximation to the median such as one or the other of two center marked values (or to their average). Each building block then uses the complex adaptive weight to generate a local output signal r by solving the equation:

$r = z - w^*_{med} x$, (where $w^*_{med}$ is multiplied by x).

Other advantages and features of the invention will become apparent from the following detailed description of the preferred embodiments and the accompanying drawings.

BRIEF DESCRIPTION OF THE DRAWINGS

The invention will now be described with reference to certain preferred embodiments thereof and the accompanying drawings, wherein.

DETAILED DESCRIPTION OF THE PREFERRED EMBODIMENTS

Initially, a conventional general adaptive array having a sidelobe canceller form and a conventional Gram-Schmidt side lobe canceller will be described. The adaptive implementation of a conventional Gram-Schmidt cascaded canceller provides a cascaded set of operationally identical, two-input canceller Gram-Schmidt $L_2$ building blocks. In accordance with the pseudo-median cascaded canceller of present invention, these Gram-Schmidt $L_2$ building blocks are replaced with new pseudo-median $L_{med}$ building blocks. Each pseudo-median $L_{med}$ building block generates a complex adaptive weight whose real and imaginary parts are found by taking the sample median value of the ratio of local main input weight training data to local auxiliary input weight training data for the real and imaginary parts separately, applies the computed weight to a function of a local main input signal and a local auxiliary input signal, and generates a filtered output signal. Theoretically, the pseudo-median $L_{med}$ building blocks produce the same optimal weight as the Gram-Schmidt $L_2$ building blocks if the number of samples of training data is very large ($K \to \infty$), and the two inputs each have symmetric probability density functions about the mean for their real and imaginary components (an example is the Gaussian pdf). In addition, the convergence MOE of the pseudo-median cascaded canceller offers a significant improvement upon Gram-Schmidt cascaded cancellers in the presence of non-Gaussian noise outliers or equivalently, for some cases, when desired signal components are present in the training data.

Figure 1:
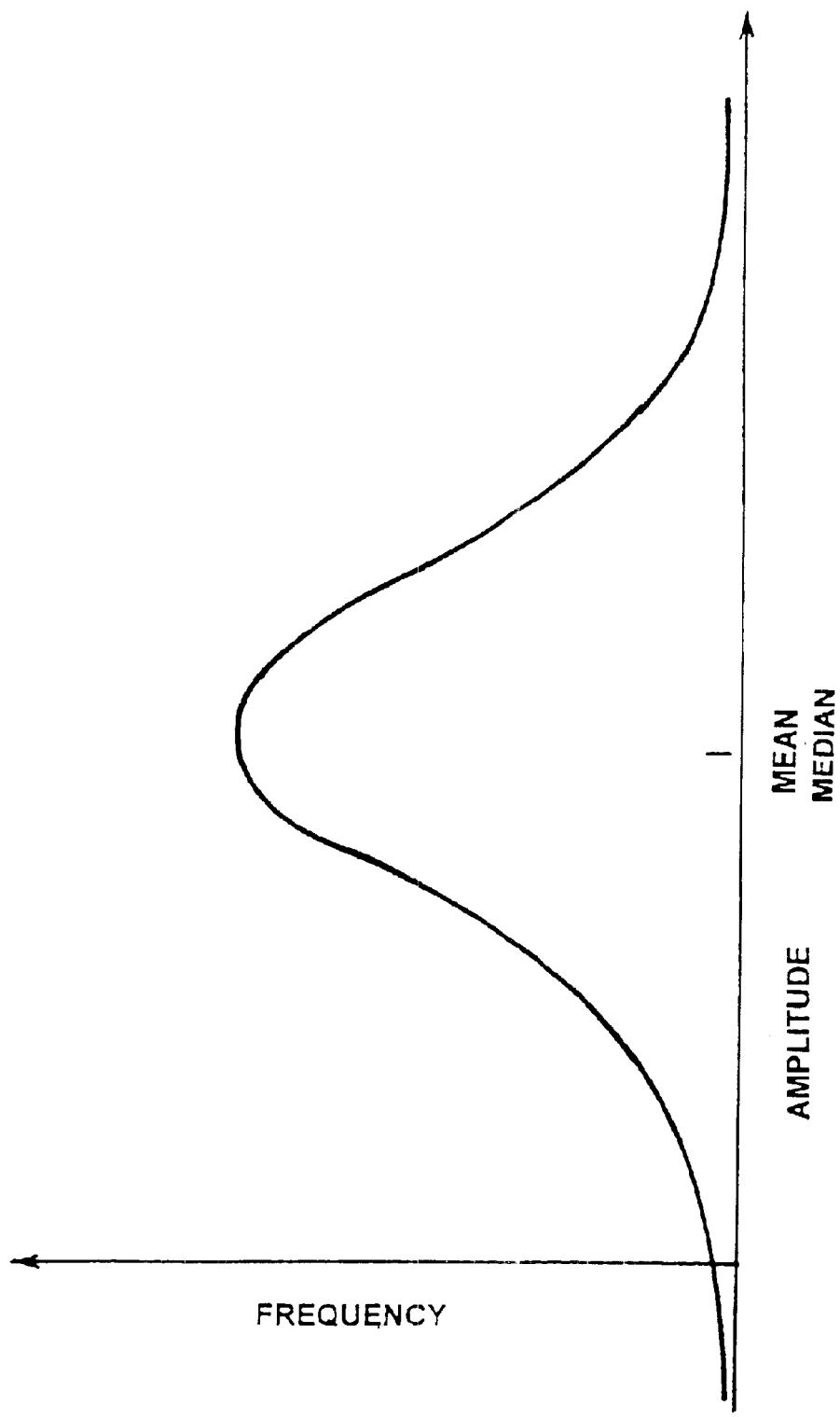
FIG. 1 illustrates a Gaussian noise distribution.
Figure 2:
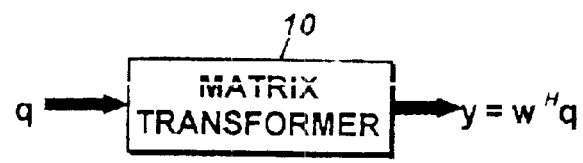
FIG. 2 is a block diagram of a general linear adaptive array.

FIG. 2 is a block diagram of a conventional general linear adaptive array processor 10. In FIG. 2, q is the input data vector, y is the output scalar, w is the complex adaptive weight vector, and H denotes Hermitian or conjugate-transpose operation. The general linear adaptive array processor 10 with a single mainbeam steering vector constraint may be converted to its equivalent sidelobe canceller form via a unitary, non-singular, square matrix transformation of the input data vector q. See generally Haykin, S., *Adaptive Filter Theory*, 3rd Ed., Prentice-Hall, N.J., 1996; Gerlach, K., Kretschmer, F. F., Jr., "Convergence Properties of Gram-Schmidt and SMI Adaptive Algorithms", IEEE Trans. Aerospace and Electronics Systems, Vol. 26, No. 1, January 1990, pp. 44–56; and Brennan, L. E., Reed, I. S., "Digital Adaptive Arrays With Weights Computed From And Applied To The Same Sample Set", Proceedings 1980 Adaptive Antenna Symposium, Rome Air Development Center report RADC-TR-80-378, Vol. 1, December 1980, pp. 236–249, the disclosure of which are incorporated herein by reference.

A non-singular, matrix transformation of the inputs of a general adaptive array does not change the theoretical SINR if weight adaptation using SMI is subsequently carried out using an identically transformed steering vector. Thus, a linear transformation can be chosen that moves all desired signal energy into a single "main" channel (as well as some noise), leaving only (transformed) noise in the remaining "auxiliary" channels, creating a sidelobe canceller form, u, of the input data vector, q. The first element or "main channel" of u is labeled $u_m = u_1$ and "auxiliary channels" are labeled $u_a = u_n$, for $n=2, \ldots, N$.

A sidelobe canceller is a specific form of the general adaptive array where the N×1 desired signal (steering) vector is set to $[1\ 0\ 0\ \ldots\ 0]^T$, the "main" or first channel weight is fixed to unity, and the (N−1)×1 auxiliary channel adaptive weight vector estimate $\hat{w}_a$ (^ denotes 'estimate of') solves the adaptive Wiener-Hopf matrix equation, $$\hat{w}_a = \hat{R}_a^{-1} \hat{r}_{am}, \tag{1}$$

where $\hat{R}_a$ is the (N−1)×(N−1) auxiliary channel input noise covariance matrix estimate, and $\hat{r}_{am}$ is the (N−1)×1 cross-correlation vector estimate between the auxiliary channels and the main channel. For Gaussian statistics, the maximum likelihood estimates of these quantities are $$\hat{R}_a = \frac{1}{K} \sum_{k=1}^{K} u_a(k) u_a(k)^H \tag{2}$$

and $$\hat{r}_{am} = \frac{1}{K} \sum_{k=1}^{K} u_a(k) u_m(k)^*, \tag{3}$$

where K is the number of weight training data samples used in the averages and * denotes complex conjugate operation. When employing equation (2) and equation (3), the sidelobe canceller uses the SMI algorithm, and its scalar output, g, is (using vector partitioning)

$$g = w_{slc}^H u = \begin{bmatrix} 1 \\ \ldots \\ -\hat{w}_a \end{bmatrix}^H u. \tag{4}$$

The conventional SMI-based sidelobe canceller in equation (4) has an equivalent Gram-Schmidt cascaded canceller form in the steady state and in the transient state with numerically identical outputs, where transient state refers to the case where weights are estimated from finite length data vectors. Infinite numerical accuracy is assumed, i.e., the cascaded weights correspond to a numerically equivalent set of linear weights equation (1) that can be applied directly to the transformed array input data vector u via equation (4), if so desired.

Figure 3:
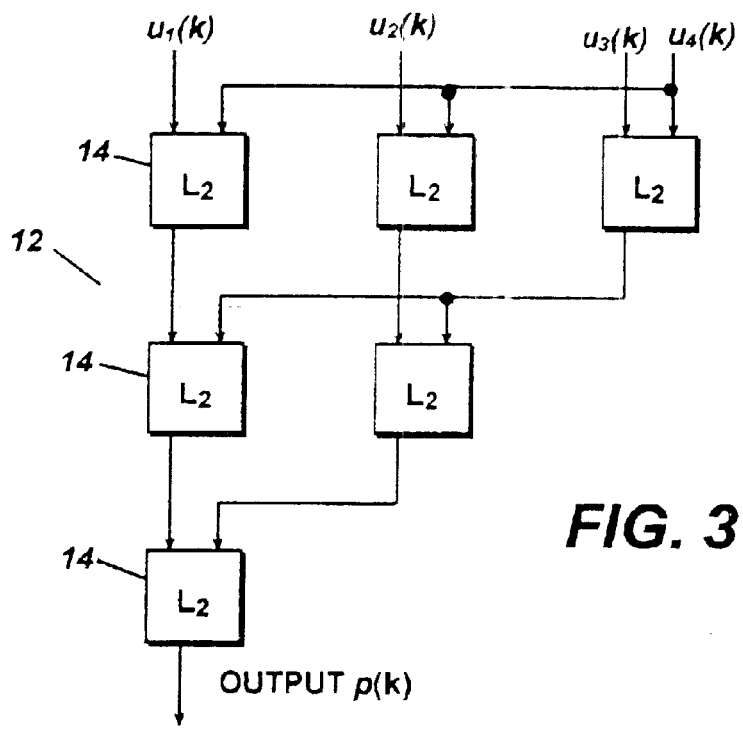
FIG. 3 is a block diagram of a conventional sample matrix inversion cascaded processor.

FIG. 3 illustrates a conventional Gram-Schmidt canceller 12 for the N=4 channel case. See generally, Monzingo, R. A., Miller, T. W, *Introduction to Adaptive Arrays*, John Wiley and Sons, New York, 1980, the disclosure of which is incorporated herein by reference. It is comprised of six identical two-input canceller Gram-Schmidt $L_2$ building blocks 14. In each building block 14, the optimal weight estimate for that building block is calculated by minimizing the square of the $L_2$-norm of the residual output vector from that building block, over some specified number of K weight training data samples.

Figure 4:
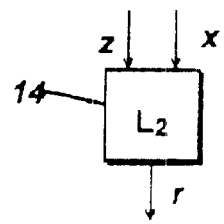
FIG. 4 is a single block of a conventional sample matrix inversion cascaded processor.

FIG. 4 illustrates a single Gram-Schmidt $L_2$ building block 14. For notational simplicity, the left input of any single building block is relabeled z, the right input is relabeled x, and the output is relabeled r. Each building block serves to have the component of z, which is correlated with x, subtracted from z. This is accomplished by choosing an optimum weight estimate $\hat{w}_{opt}$ such that the residual r is statistically uncorrelated to x. The least-squares method is used to estimate $w_{opt}$ by minimizing over the set of complex weights w, the square of the $L_2$ norm of the residual output $r=z-w^*x$ where $r=r(k)$, $z=z(k)$, and $x=x(k)$, for $k=1, \ldots, K$; i.e., for any single building block, $$\hat{w}_{opt} = \arg\min_{w}\left[\frac{1}{K}\sum_{k=1}^{K} |z(k) - w^* x(k)|^2\right]. \tag{5}$$

This results in the scalar adaptive Wiener-Hopf equation, $$\hat{w}_{opt} = \hat{R}_{xx}^{-1} \hat{r}_{xz}, \tag{6}$$

where maximum likelihood estimates again may be used for the scalar input noise covariance estimates, assuming Gaussian statistics, as $$\hat{R}_{xx} = \frac{1}{K} \sum_{k=1}^{K} x(k)x(k)^*, \tag{7}$$

and $$\hat{r}_{xz} = \frac{1}{K} \sum_{k=1}^{K} x(k)z(k)^*. \tag{8}$$

Note that equation (7) and equation (8) are sensitive to non-Gaussian noise contaminants just like their matrix counterparts in equation (2) and equation (3).

As set forth above the conventional general adaptive array processor may be equivalently transformed in terms of SINR into its conventional Gram-Schmidt cascaded canceller form. The adaptive implementation of a conventional Gram-Schmidt cascaded canceller provides a cascaded set of operationally identical, two-input canceller $L_2$ building blocks.

Figure 6:
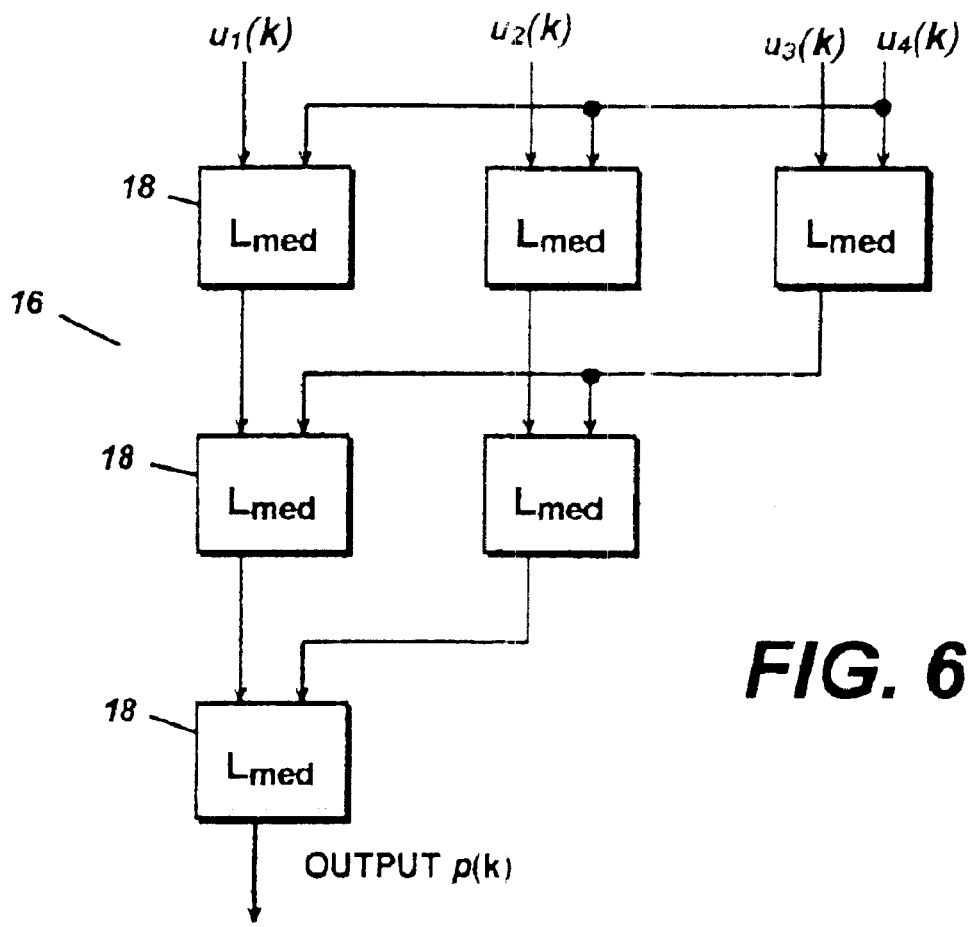
FIG. 6 is a block diagram of a pseudo-median cascaded canceller processor in accordance with the present invention.
Figure 7:
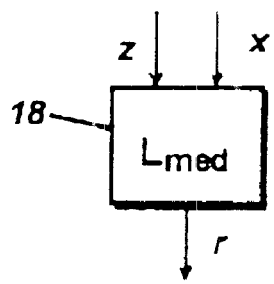
FIG. 7 is a single building block of a pseudo-median cascaded canceller processor in accordance with the present invention.

Replacing the $L_2$ building blocks with pseudo-median $L_{med}$ building blocks 18 throughout a cascaded canceller results in the pseudo-median cascaded canceller 16 configuration of the present invention shown in FIG. 6. FIG. 7 illustrates a single pseudo-median $L_{med}$ building block canceller 18. Each of the pseudo-median $L_{med}$ building blocks 18 computes a complex adaptive weight $w_{med}$ whose real and imaginary parts are found by taking the sample median value of the ratio of local main input weight training data to local auxiliary input weight training data for the real and imaginary parts separately. Each of the pseudo-median $L_{med}$ building blocks 18 then applies the complex conjugate of the computed weight $W^*_{med}$ to a function of a local main input signal and a local auxiliary input signal, and generates a filtered local output signal, r, by solving the following equation: $r = z - w^*_{med} x$. Note that FIG. 6 illustrates pseudo-median cascaded canceller with N=4 inputs, however, any number N of inputs may be utilized.

In the first level of processing, N input signals are input into N−1 pseudo-median $L_{med}$ building blocks 18 to generate N−1 local output signals. In the next level of processing, N−1 local input signals are input into N−2 pseudo-median $L_{med}$ building blocks 18 to generate N−2 local output signals. This process is repeated until one final output signal remains.

The pseudo-median cascaded canceller of the present invention may be implemented by a set of program instructions on an arithmetical processing device such as a general-purpose digital signal processor (DSP) or microprocessor to carry out in real time the computational steps presented above. Alternatively, custom-built application specific integrated circuits (ASIC), field-programmable gate arrays (FPGA), or firmware can be fabricated to perform the same computations as a set of logic instructions in hardware. These implementations are interchangeable.

The pseudo-median $L_{med}$ building block 18 computes complex adaptive weight, $w_k$, as the sum of a real part and an imaginary part, which are found by taking the sample median value of the ratio of local main input weight training data to local auxiliary input weight training data for the real and imaginary parts separately. First, form the set $w_k$ as $w_k = (z(k)/x(k))^*$, for k=1,2, ..., K where K is the number of training samples. The sample median of the real parts of $\{w_k\}$ is taken as the real part of the new optimal weight, and the sample median of the imaginary parts of $\{w_k\}$ is taken as the imaginary part of the new optimal weight. As K→∞, and assuming that, for this analysis, there are no outliers, the resulting adaptive weight, $$w_{med} = \underset{k=1 \text{ to } K}{MED}\left[\text{real}\left(\frac{z(k)^*}{x(k)^*}\right)\right] + j\left\{\underset{k=1 \text{ to } K}{MED}\left[\text{imag}\left(\frac{z(k)^*}{x(k)^*}\right)\right]\right\} \quad (9)$$

converges to the same optimal complex weight as a Gram-Schmidt $L_2$ building block using the same weight training data. This convergence occurs if both z and x each have a zero mean, Gaussian probability density function (pdf) for both their real and imaginary parts, and even more generally, convergence occurs if all four pdf's are symmetric (i.e., z and x each have complex symmetric densities). In equation (9), MED refers to the sample median (or, if K is even, the MED may be taken as either of the middle two order-ranked samples, or their average), $j = \sqrt{-1}$ is the unit imaginary number, real means "real part of", and imag means "imaginary part of".

Note that alternative embodiments of the invention allow the processor to calculate and use only the real or only the imaginary portion of $w_{med}$.

For the following description, the explicit k dependence is dropped from the variables z, x, r, and w, for notational simplicity, and K is assumed to approach infinity (K→∞). Starting with the Gram-Schmidt $L_2$ building block canceller, if a priori knowledge of the scalar auxiliary channel input noise covariance $R_{xx}$ and scalar cross-correlation $r_{xz}$ are available, the optimal weight is obtained using mean square error (MSE) criterion and results in the two-input, scalar, Wiener-Hopf equation, $w_{opt} = R_{xx}^{-1} r_{xz}$. The residual value output is defined as $r_u = z − w^*_{opt} x$ after optimal weighting is applied, and $r_u$ is uncorrelated with x by definition. Solving for z yields $z = r_u + w^*_{opt} x$, and substituting this into $w = (z/x)^*$ from equation (9), results in $$w = \left(\frac{z}{x}\right)^* = \frac{r_u^* + w_{opt} x^*}{x^*} = \left(\frac{r_u}{x}\right)^* + w_{opt}. \quad (10)$$

Taking, separately, the statistical medians of the real and imaginary parts of equation (10) yields $$w_{med_{r,i}} = med_{r,i}\left[\left(\frac{r_u}{x}\right)^* + w_{opt}\right] = med_{r,i}\left[\left(\frac{r_u}{x}\right)^*\right] + w_{opt_{r,i}} \quad (11)$$

where $med_{r,i}$ refers to the statistical median of both of the real and imaginary parts separately, and similarly for $w_{opt_{r,i}}$; since $w_{opt_{r,i}}$ are constants, they come out of the median function.

For the case where z and x are each zero mean, complex Gaussian random variables, $med_{r,i}[(r_u/x)^*] = 0$, yielding the desired components of the optimal weight, $$w_{opt} = w_{opt_r} + j w_{opt_i}.$$

The random quantity $r_u$ is a linear combination of z and x and is therefore a zero mean, complex Gaussian random variable. Since $r_u$ and x are uncorrelated and Gaussian, they are independent. The quotient $(r_u/x)^*$ is normalized by multiplying by the ratio of standard deviations, $$s = \frac{\sigma_x}{\sigma_{r_u}}\left(\frac{r_u}{x}\right)^* = \left(\frac{r_u^\circ}{x^\circ}\right)^*, \quad (12)$$

where $\sigma_x$ and $\sigma_{r_u}$ are the standard deviations of x and $r_u$ respectively, and $x^\circ$ and $r_u^\circ$ are normalized versions of x and $r_u$, respectively, each with unit variance. The pdf and cumulative distribution function (cdf) of $s_{r,i}$ (subscripts r and i refer to the real and imaginary parts of s, separately) are respectively derived as $$f_{s_{r,i}}(s_{r,i}) = \frac{1}{2(s_{r,i}^2 + 1)^{3/2}}, \quad -\infty \leq s_{r,i} \leq \infty, \quad (13)$$

and $$F_{s_{r,i}}(s_{r,i}) = \frac{1}{2} + \frac{s_{r,i}}{2(s_{r,i}^2 + 1)^{1/2}}, \quad -\infty \leq s_{r,i} \leq \infty. \quad (14)$$

Figure 5:
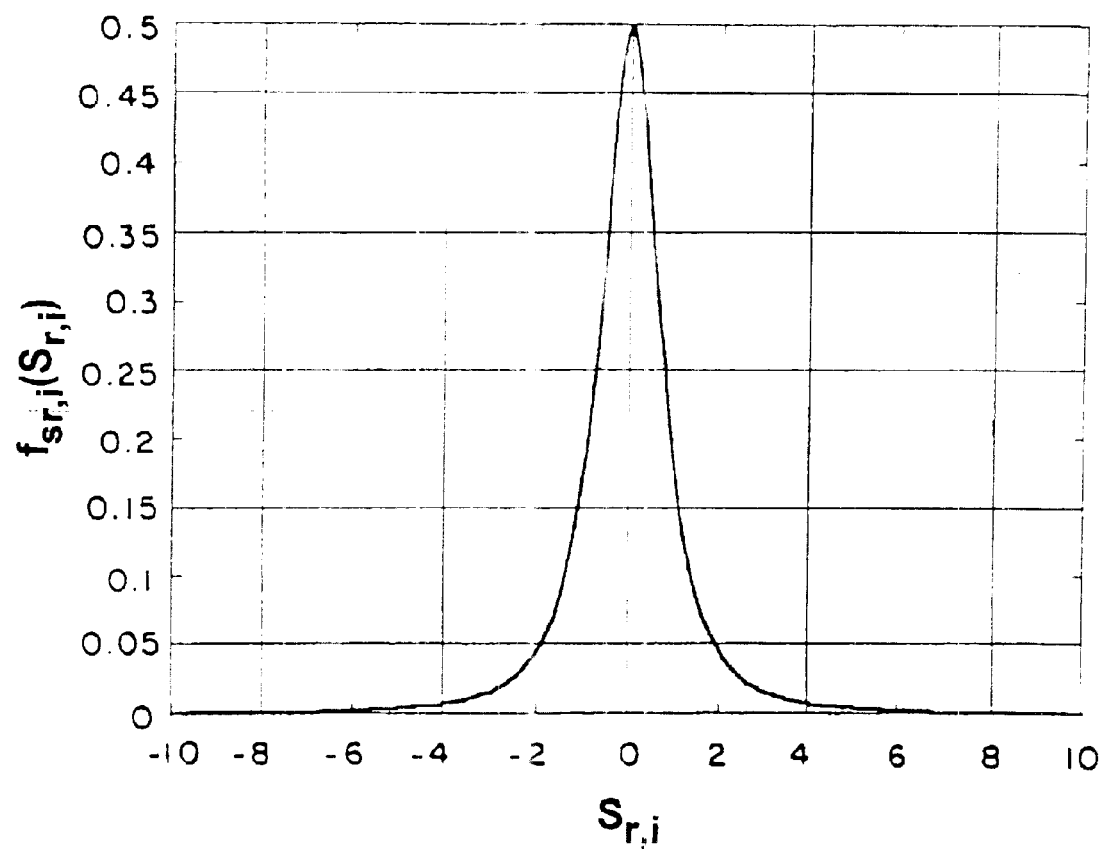
FIG. 5 is a graph of the probability density function of real or imaginary parts of $s=(r°_u/x°)^*$, where $x°$ and $r°_u$ are normalized versions of input variables x and output variable $r_u$, each with unit variance.

FIG. 5 is a graph of the probability density function of the real or imaginary parts of $s = (r_u^\circ/x^\circ)^*$. The terms $f_{s_{r,i}}(s_{r,i})$ and $s_{r,i}$ refer separately to the real, r, and imaginary, i, parts of $f_s(s)$ and s. It is readily seen in FIG. 6 and via equation (13) that $med_{r,i}(s) = 0$. Using the fact that $med_{r,i}(ay) = a\ med_{r,i}(y)$ for any real constant a and any complex random variable y, equation (11) becomes via equation (12), $$w_{med_{r,i}} = w_{opt_{r,i}}. \quad (15)$$

Therefore $w_{med} \to w_{opt}$ as K→∞, as claimed for equation (9).

The convergence of a pseudo-median $L_{med}$ building block and convergence performance of $w_{med}$ will now be described. For Gaussian statistics, and for adaptive implementations of the two-input pseudo-median cascaded can celler (i.e., for finite K), the order statistics pdf, $f_p(s_{r,i})$ is defined as a function of $s_{r,i}$ as $$f_p(s_{r,i}) = \frac{K!}{(p-1)!(K-p)!} F_{s_{r,i}}^{p-1}(s_{r,i}) \times [1 - F_{s_{r,i}}(s_{r,i})]^{K-p} f_{s_{r,i}}(s_{r,i}). \quad (16)$$

This is used to determine the median order statistics of $s_{r,i}$, using equations (13) and (14), where $p=(K+1)/2$ is the median (for K odd). For convenience, just the results will be presented: using equation (12), the means of the median order statistics were found to be zero, and the variances of the median order statistics were found to be: $\text{var}(\text{med}_{r,i}(s))=1/(K-1)$ (where 'var' denotes variance), for K an odd integer and K>1. Thus, because $\text{var}(ay_r)=a^2\text{var}(y_r)$ holds for any real constant a and for any real random variable $y_r$, the variance of $w_{\text{med}_{r,i}}$ equation (11) is $$\text{var}(w_{\text{med}_{r,i}}) = \frac{\sigma_{r_u}^2}{\sigma_x^2}\left(\frac{1}{K-1}\right). \quad (17)$$

This variance will be used in the following derivation of the analytical convergence rate.

The figure of merit often used to assess canceller performance is the normalized output residue power (NORP), here labeled η, and it is approximately equal to the inverse of the SINR performance metric for non-concurrent processing. Non-concurrent processing refers to the case where adaptive weights are trained using secondary weight training data, but are applied to statistically independent primary data possibly containing desired signal components. This provides justification for directly comparing the SINR convergence MOE to the NORP convergence MOE since desired signal, which is only in the primary data (and only in the main channel), is assumed to pass through the canceller unaffected. For a two-input canceller, η is defined as, $$\eta = \frac{E\{|z - w_o^* x|^2\}}{res_{opt}}, \quad (18)$$

where $w_o$ is the weight chosen under some arbitrary performance criterion, E denotes expectation, and $$res_{opt} = E\{|z - w_{opt}^* x|^2\} \quad (19)$$

is the optimal minimum residue power found by using $w_{opt} = R_{xx}^{-1} r_{xz}$. If $w_o$ in equation (18) is chosen under MSE criterion, then $w_o = w_{opt}$, and η achieves its minimum value of 1, or equivalently, 0 dB. However, this requires perfect a priori knowledge of the relevant statistics, so for adaptive methods such as SMI or pseudo-median $L_{med}$ criterion, $$w_o = w_{opt} + \tilde{w}, \quad (20)$$

where $\tilde{w}$ is some difference weight from the complex constant $w_{opt}$. Since $r_u = z - w_{opt}^* x$, using equation (18) and equation (20):

$$\eta = \frac{E\{|z - w_{opt}^* x - \tilde{w}^* x|^2\}}{res_{opt}} = \frac{E\{|r_u - \tilde{w}^* x|^2\}}{res_{opt}} \text{ and}, \quad (21)$$

and, $$res_{opt} = E\{|z - w_{opt}^* x|^2\} = E\{|r_u|^2\} \sigma_{r_u}^2. \quad (22)$$

Since $r_u$ is uncorrelated with x by definition, $E\{r_u x^*\} = E\{x r_u^*\} = 0$, so, from the numerator of equation (21), $$E\{|r_u - \tilde{w}^* x|^2\} = \sigma_{r_u}^2 + |\tilde{w}|^2 \sigma_x^2, \quad (23)$$

thus, substituting equation (22) and equation (23) into equation (21), results in $$\eta = 1 + |\tilde{w}|^2 \frac{\sigma_x^2}{\sigma_{r_u}^2} = 1 + \tilde{w}_r^2 \frac{\sigma_x^2}{\sigma_{r_u}^2} + \tilde{w}_i^2 \frac{\sigma_x^2}{\sigma_{r_u}^2}. \quad (24)$$

Note that subscripts r and i refer to the real and imaginary components of $\tilde{w}$, respectively.

The quantity $w_{med}$ in equation (9) was shown to converge to $w_{opt}$, and its variance about the mean of $w_{opt}$, as a function of K, was given in equation (17) for both the real and imaginary parts of the weights. For the two-input pseudo-median cascaded canceller, $\tilde{w}_{r,i} = w_{med\ r,i} - w_{opt_{r,i}}$, so $E\{\tilde{w}_r^2\} = E\{\tilde{w}_i^2\} = \text{var}(w_{med\ r,i}) = \sigma_{r_u}^2/[\sigma_x^2(1/(K-1))]$. Thus, from equation (24), the average convergence rate for the pseudo-median $L_{med}$ building block is found to be $$E\{\eta\} = 1 + 2/(K-1), \quad (25)$$

for zero mean, complex Gaussian inputs (z and x). In comparison, the conventional Gram-Schmidt $L_2$ building block converges just slightly faster: $1 + 1/(K-1)$, for the same assumptions, but, as will be shown in the next section, it is not nearly as robust as the pseudo-median $L_{med}$ building block. Lastly, it is noted that the two-input pseudo-median $L_{med}$ algorithm just derived, has, like the two input SMI ($L_2$) algorithm, a convergence rate shown here to be only a function of the number of samples, K, and thus is independent of the two-input, input noise covariance matrix.

The performance of the conventional SMI and pseudo-median cascaded canceller of the present invention were compared in the presence of a single sample noise outlier in the weight training data. The noise was given a range of powers, normalized to the internal noise level. The noise outlier was restricted to be in the weight training data only. Adapted weights were not applied to the same data that was used to train the adapted weights. Instead, they were applied to statistically independent data (non-concurrent processing was used). For a canceller configuration, the desired signal in the main channel is passed through to the output with unity gain while only correlated noise is removed at each stage.

For simulations discussed next and shown in FIGS. 8 and 9, noise outliers were only added to the main channel ($u_1$) in the weight training data, emulating the addition of a scaled desired-signal vector, $[\hat{a}\ 0\ \ldots\ 0]^T$, where $\hat{a}^2$ is the noise outlier or added desired signal power. The addition of noise outliers to all channels, or to just the auxiliary channels only, resulted in much less degradation of the SMI convergence rate for all noise power levels (results not shown.) It will be seen for the pseudo-median cascaded canceller of the present invention that desired signal components present in the main channel of the weight training data have a significantly reduced effect on noise cancellation than in the conventional SMI ($L_2$) cascaded processor.

Figure 8:
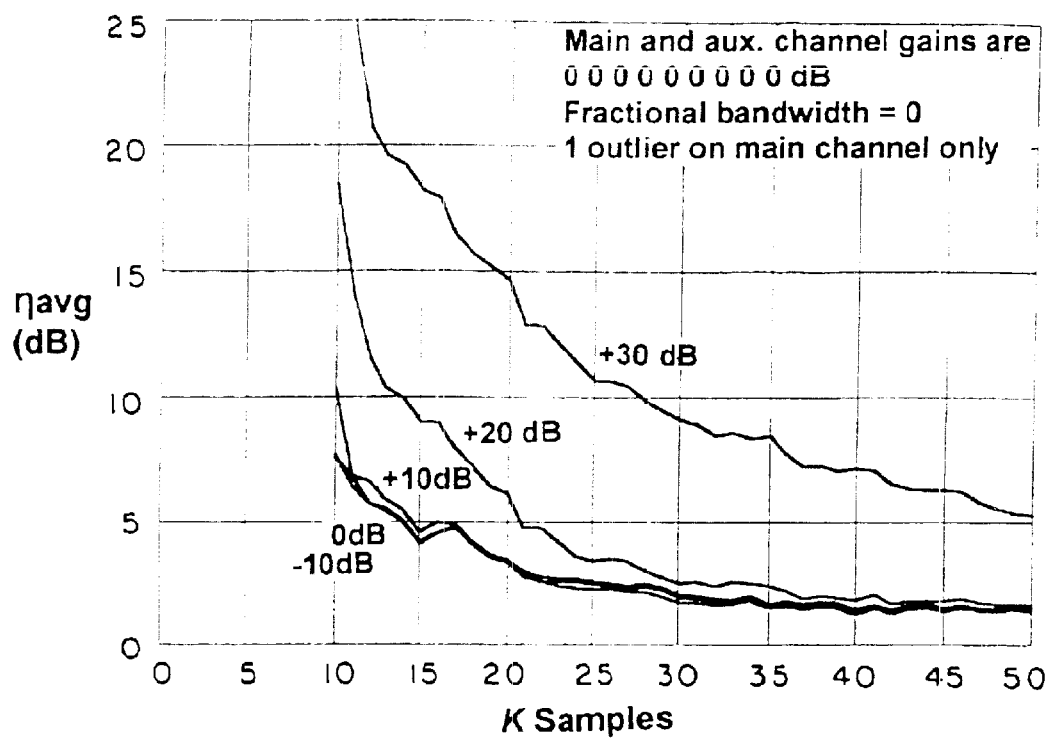
FIG. 8 is a graph showing the convergence rate for different levels of non-Gaussian noise for a conventional sample matrix inversion processor which plots normalized output power residue vs. number of samples.
Figure 9:
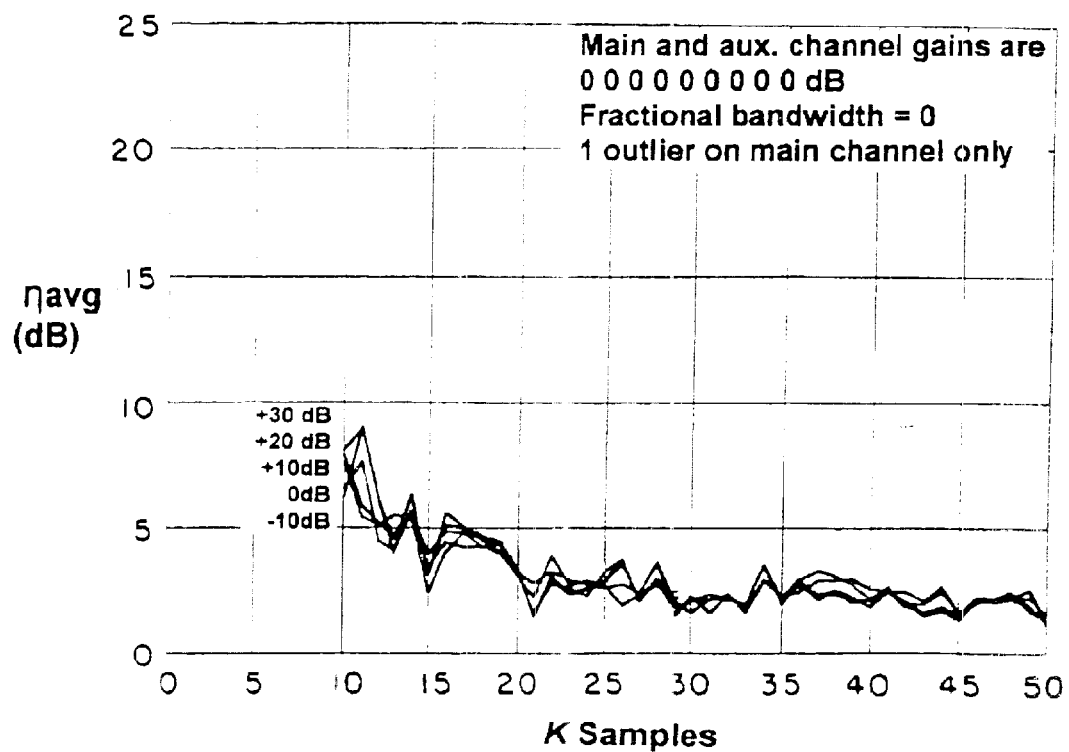
FIG. 9 is a graph showing the convergence rate for different levels of non-Gaussian noise for a sample matrix inversion processor in accordance with the present invention which plots normalized output power residue vs. number of samples.

FIGS. 8 and 9 will illustrate the advantages of the present invention.

Convergence plots for a conventional SMI ($L_2$) cascaded canceller are shown in FIG. 8 for various noise powers. The value for $\eta_{avg}$, a Monte Carlo average of 20 normalized output residue powers, is plotted vs. K, the number of weight training samples used. Ten channels were chosen (N=10), and one +20 dB narrowband Gaussian noise barrage sidelobe jammer (20 dB above internal receiver noise power) plus uncorrelated Gaussian noise were modeled as inputs in the simulations shown here. The SMI algorithm predicts 3 dB convergence in about K=2N=20 samples, which appears to be satisfied for plots corresponding to negligible noise outlier power values (−10 dB to +10 dB). However, as the noise outlier power increases, it is evident that convergence slows significantly. For example, for a single +20 dB noise outlier, the convergence MOE is about 27 samples; for a single +30 dB noise outlier, many more than 50 samples are required. For three +20 dB noise outliers (equal to the jammer level and therefore difficult to prescreen) (graph not shown here) the convergence MOE is 48 samples. The curves in FIG. 8 thus illustrate the degradation in performance of a conventional SMI ($L_2$) processor when applied to data with increasing noise outlier powers.

As shown in FIG. 9, for the pseudo-median cascaded canceller of the present invention, also with N=10 input channels, convergence is essentially unaffected by the addition of noise outliers of any power level. The convergence rate of the present invention is approximately equal to the ideal SMI convergence rate in pure Gaussian jammer and noise environments. In fact, for three and even five noise outliers of any power level (graphs not shown here), convergence is still essentially unaffected. Thus, it is evident that strong desired signals in the weight training data cause little loss in noise cancellation; the pseudo-median cascaded canceller equivalent adaptive weight vector quickly approaches the optimum weight vector and the median function essentially ignores the added desired signal vector (s).

It is well known that for the SMI algorithm in Gaussian noise with no noise outliers, the convergence rate is independent of the input noise covariance matrix for both the two-input AND general N-input cases.

For the pseudo-median cascaded canceller, however, for the same assumptions, it appears that strict invariance to the input noise covariance matrix is generally limited to just the two-input case. However, simulations (not shown here) indicate that for more than two inputs, this desired invariance to the input noise covariance matrix is, in fact, true when the number of discrete noise sources is approximately one-third or less of the total number of degrees of freedom N. This situation is representative of many realistic (low rank) noise scenarios, making the pseudo-median canceller of the present invention very attractive for many real-world processing environments. Even as the number of noise sources increases greater than this threshold, the convergence rate degrades gracefully and eventually becomes similar to the SMI ($L_2$) Gram-Schmidt canceller with noise outliers present in the weight training data. Thus it is apparent that the pseudo-median (Lmed) cascaded canceller of the present invention has very desirable features compared to conventional adaptive signal processors.

Figure 10:
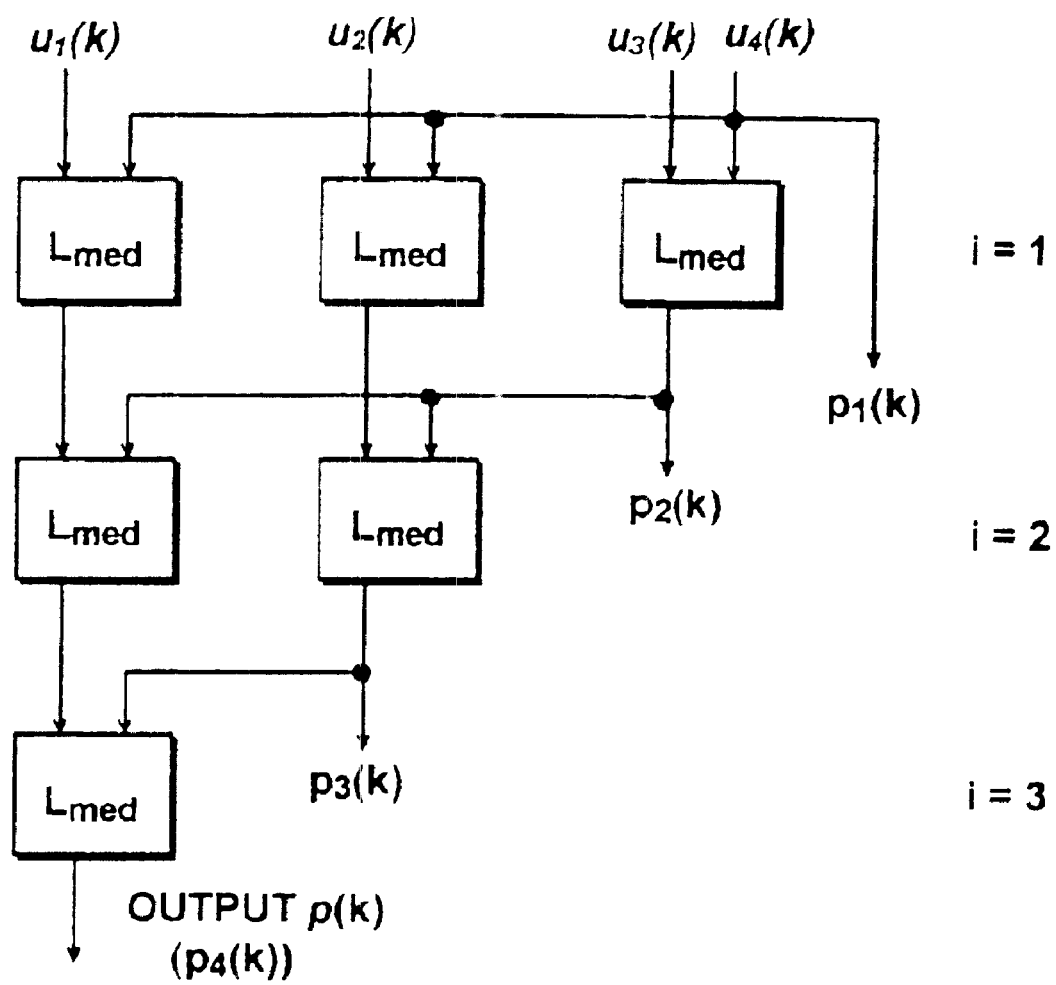
FIG. 10 is a block diagram of a pseudo-median cascaded canceller processor in accordance with the present invention illustrating another aspect of the invention.

The pseudo-median (Lmed) cascaded canceller of the present invention has an additional feature which may be used to advantage in adaptive signal processing. Recall from FIG. 4 that each $L_{med}$ building block generates a local filtered output signal, r, by solving the following equation: $r = z − w^*_{med} x$, where $r=r(k)$, $z=z(k)$, and $x=x(k)$, for $k=1, \ldots, K$. Refer next to FIG. 10, which is a block diagram of a pseudo-median (Lmed) cascaded canceller of the present invention. Each row of building blocks is designated as i, where $i=1, \ldots N−1$. In FIG. 10, the N=4 input channel case results in three rows of building blocks (i=1,2,3). The main input channel is designated $u_1(k)$. Notice that each of the left-most building blocks "a first end building block" in each row of FIG. 10 receives a local input signal which is either the main channel $u_1(k)$ (for the first row of building blocks) or is derived from the main channel $u_1(k)$ through prior building blocks (for building block row i=2,3). Also shown in FIG. 10, at the right most end of each row of building blocks, there is a "last end building block", at the end of the row opposite the first end building block fed by the main channel $u_1$. Each of the N−1 last end building blocks processes a local auxiliary input fed originally from the from the last (Nth) input channel ($u_N(k)$). Each of these N−1 last end building blocks has a local filtered output r, which is redesignated as $p_i(k)$ (for i=2, 3, . . . , N) for convenience. There is also a first of these p(k) values, $p_1(k)$, however, which is not an output of a last end $L_{med}$ building block, but instead is the Nth input channel (which is an auxiliary channel). So, for the N=4 case in FIG. 10, $p_1(k)=u_4(k)$, and generally, $p_1(k)$ is equal to $u_N(k)$.

Each of the N values $p_i(k)$ (i=1,2, . . . , N) is approximately statistically uncorrelated to the rest, and so the $p_i(k)$ values are uncorrelated with each other. This is a useful form for input channels to have for input to another processing algorithm (such as for example, a a Least Mean Square (LMS) algorithm, see Haykin, S. Adaptive Filters Theory, Prentice Hall, $3^{rd}$ ed., 1996, p 365)). This is a desirable property for data channels that are used as input channels for follow-on adaptive processors.

In this form, the pseudo-median cascaded canceller acts as a robust data channel pre-processor, and provides the data in a more useful form. Optimally, the $p_i(k)$ values which are supplied by the building blocks, are supplied to a second local output channel that is separate from the local output channel. In this manner, there will be no interference with the original data flow path of the $L_{med}$ building block output r.

The invention has been described with reference to certain preferred embodiments thereof. It will be understood, however, that modification and variations are possible within the scope of the appended claims.

What is claimed is:

1. A signal processing building block for use in an adaptive signal processing system comprising:
   a main input channel which receives a main input signal;
   an auxiliary input channel which receives an auxiliary input signal; and
   a processing mechanism that:
      generates a complex adaptive weight,
         the complex adaptive weight including a sample median value of a real part of a ratio of a main input weight training data signal to an auxiliary input weight training data signal, and a sample median value of an imaginary part of the ratio of a main input weight training data signal to an auxiliary input weight training data signal, and
      applies the computed complex adaptive weight to a function of the main input signal and the auxiliary input signal to generate an output signal.

2. A signal processing building block for use in an adaptive signal processing system comprising:
   a main input channel which receives a main input signal;
   an auxiliary input channel which receives an auxiliary input signal; and
   a Processing mechanism that;
      generates a complex adaptive weight, and
      applies the computed complex adaptive weight to a function of the main input signal and the auxiliary input signal to generate an output signal, the complex adaptive weight comprising a sample median value of a real part of a ratio of a main input weight training data signal to an auxiliary input weight training data signal.

3. A signal processing building block for use in an adaptive signal processing system comprising:
a main input channel which receives a main input signal;
an auxiliary input channel which receives an auxiliary input signal; and
a processing mechanism that:
generates a complex adaptive weight, and
applies the computed complex adaptive weight to a function of the main input signal and the auxiliary input signal to generate an output signal,
wherein the processing mechanism generates the complex adaptive weight, $w_{med}$, according to $$w_{med} = \underset{k=1 \text{ to } K}{MED}\left[\text{real}\left(\frac{z(k)^*}{x(k)^*}\right)\right] + j\left\{\underset{k=1 \text{ to } K}{MED}\left[\text{imag}\left(\frac{z(k)^*}{x(k)^*}\right)\right]\right\}$$

where K is the number of weight training data samples, z is the main input signal, j is a unit imaginary number, and x is the auxiliary input signal.

4. A signal processing building block as claimed in claim 3, wherein the processing mechanism generates the output signal, r, according to $r = z - w^*_{med} x$.

5. An adaptive signal processing system for receiving a plurality of input signals corresponding to a common target signal and for sequentially decorrelating the input signals to cancel the correlated noise components therefrom, the adaptive signal processing system comprising:
a plurality of building blocks arranged in a cascaded configuration for sequentially decorrelating each of the input signals from each other of the input signals to thereby yield a single filtered output signal;
wherein each building block includes:
a local main input channel which receives a local main input signal,
a local auxiliary input channel which receives a local auxiliary input signal,
and
a processing mechanism that
calculates a complex adaptive weight, and
generates a local output signal, utilizing the complex adaptive weight,
the complex adaptive weight comprising a sample median value of a real part of a ratio of a main input weight training data signal to an auxiliary input weight training data signal, and a sample median value of an imaginary part of the ratio of the main input weight training data signal to the auxiliary input weight training data signal.

6. An adaptive signal processing system as in claim 5, wherein each building block supplies the local output signal to a local output channel.

7. An adaptive signal processing system for receiving a plurality of input signals corresponding to a common target signal and for sequentially decorrelating the input signals to cancel the correlated noise components therefrom, the adaptive signal processing system comprising:
a plurality of building blocks arranged in a cascaded configuration for sequentially decorrelating each of the input signals from each other of the input signals to thereby yield a signal filtered output signal;
wherein each building block includes:
a local main input channel which receives a local main input signal,
a local auxiliary input channel which receives a local auxiliary input signal,
and
a processing mechanism that
calculates a complex adaptive weight, and
generates a local output signal, utilizing the complex adaptive weight,
wherein each building block generates the complex adaptive weight, $w_{med}$, according to $$w_{med} = \underset{k=1 \text{ to } K}{MED}\left[\text{real}\left(\frac{z(k)^*}{x(k)^*}\right)\right] + j\left\{\underset{k=1 \text{ to } K}{MED}\left[\text{imag}\left(\frac{z(k)^*}{x(k)^*}\right)\right]\right\}$$

where K is the number of weight training data samples, z is the local main input signal, j is a unit imaginary number, and x is the local auxiliary input signal; and
each building block generates the local output signal, r, according to $$r = z - w^*_{med} x.$$

8. An adaptive signal processing method comprising:
receiving a plurality of input signals corresponding to a common target signal;
inputting the input signals into a plurality of building blocks arranged in a cascade configuration for sequentially decorrelating each of the input signals from each other of the input signals;
generating a single filtered output signal;
wherein each building block includes a local main input channel which receives a local main input signal, a local auxiliary input channel which receives a local auxiliary input signal, and a processing mechanism that calculates a complex adaptive weight and generates a local output signal, utilizing the complex adaptive weight,
the processing mechanism calculating the complex adaptive weight $w_{med}$ by calculating a sample median value of a real part of a ratio of a main input weight training data signal to an auxiliary input weight training data signal and calculating a sample median value of an imaginary part of the ratio of the main input weight training data signal to the auxiliary input weight training data signal.

9. An adaptive signal processing method comprising:
receiving a plurality of input signals corresponding to a common target signal;
inputting the input signals into a plurality of building blocks arranged in a cascade configuration for sequentially decorrelating each of the input signals from each other of the input signals;
generating a single filtered output signal;
wherein each building block includes a local main input channel which receives a local main input signal, a local auxiliary input channel which receives a local auxiliary input signal, and a processing mechanism that generates a complex adaptive weight, and generates a local output signal, utilizing the complex adaptive weight,
wherein said processing mechanism generates the complex adaptive weight $w_{med}$ by calculating a sample median value of a real part of a ratio of a main input weight training data signal to an auxiliary input weight training data signal.

10. An adaptive signal processing method comprising:
receiving a plurality of input signals corresponding to a common target signal;
inputting the input signals into a plurality of building blocks arranged in a cascade configuration for sequentially decorrelating each of the input signals from each other of the input signals;
generating a single filtered output signal;
wherein each building block includes a local main input channel which receives a local main input signal, a local auxiliary input channel which receives a local auxiliary input signal, and a processing mechanism that calculates a complex adaptive weight, and generates a local output signal, utilizing the complex adaptive weight,
wherein each building block calculates the complex adaptive weight $w_{med}$ by calculating a sample median value of an imaginary part of a ratio of a main input weight training data signal to an auxiliary input weight training data signal.

11. An adaptive signal processing method comprising:
receiving a plurality of input signals corresponding to a common target signal;
inputting the input signals into a plurality of building blocks arranged in a cascade configuration for sequentially decorrelating each of the input signals from each other of the input signals;
generating a single filtered output signal;
wherein each building block includes a local main input channel which receives a local main input signal, a local auxiliary input channel which receives a local auxiliary input signal, and a processing mechanism that calculates a complex adaptive weight, and generates a local output signal, utilizing the complex adaptive weight,
wherein each building block calculates the complex adaptive weight, $w_{med}$, according to $$w_{med} = \underset{k=1 \text{ to } K}{MED}\left[\text{real}\left(\frac{z(k)^*}{x(k)^*}\right)\right] + j\left\{\underset{k=1 \text{ to } K}{MED}\left[\text{imag}\left(\frac{z(k)^*}{x(k)^*}\right)\right]\right\}$$

where K is the number of weight training data samples, z is the local main input signal, j is the unit imaginary number, and x is the local auxiliary input signal.

12. An adaptive signal processing method as claimed in claim 11, wherein each building block generates the local output signal, r, by solving the equation:

$$r = z - w_{med} x.$$

13. An adaptive signal processing system comprising:
means for receiving a plurality of input signals corresponding to a same target signal;
means for inputting the input signals into a plurality of building blocks arranged in a cascade configuration for sequentially decorrelating each of the input signals from each other of the input signals;
means for generating a single filtered output signal;
wherein each building block includes a means for receiving a local main input signal, means for receiving a local auxiliary input signal, and processing means for calculating a complex adaptive weight and generating a local output signal, utilizing the complex adaptive weight,
the complex adaptive weight $w_{med}$ comprising a sample median value of a real part of a ratio of a main input weight training data signal to an auxiliary input weight training data signal, and a sample median value of an imaginary part of the ratio of a main input weight training data signal to the auxiliary input weight training data signal.

14. An adaptive signal processing system comprising:
means for receiving a plurality of input signals corresponding to a same target signal;
means for inputting the input signals into a plurality of building blocks arranged in a cascade configuration for sequentially decorrelating each of the input signals from each other of the input signals;
means for generating a single filtered output signal;
wherein each building block includes means for receiving a local main input signal,
means for receiving a local auxiliary input signal, and processing means for calculating a complex adaptive weight and generating a local output signal, utilizing the complex adaptive weight,
wherein the complex adaptive weight $w_{med}$ comprises a sample median value of a real part of a ratio of a main input weight training data signal to an auxiliary input weight training data signal.

15. An adaptive signal processing system comprising:
means for receiving a plurality of input signals corresponding to a same target signal;
means for inputting the input signals into a plurality of building blocks arranged in a cascade configuration for sequentially decorrelating each of the input signals from each other of the input signals;
means for generating a single filtered output signal;
wherein each building block includes means for receiving a local main input signal, means for receiving a local auxiliary input signal, and processing means for calculating a complex adaptive weight and generating a local output signal, utilizing the complex adaptive weight,
wherein each building block calculates the complex adaptive weight, $w_{med}$, according to $$w_{med} = \underset{k=1 \text{ to } K}{MED}\left[\text{real}\left(\frac{z(k)^*}{x(k)^*}\right)\right] + j\left\{\underset{k=1 \text{ to } K}{MED}\left[\text{imag}\left(\frac{z(k)^*}{x(k)^*}\right)\right]\right\}$$

where K is the number of weight training data samples, z is the local main input signal, j is the unit imaginary number, and x is the local auxiliary input signal; and
generates the local output signal, r, $$r = z - w^*_{med} x.$$

16. An adaptive signal processing system for receiving a plurality input signals corresponding to a common target signal and for sequentially decorrelating the input signals to cancel the correlated noise components therefrom, the adaptive signal processing system comprising:
a plurality of building blocks arranged in a cascaded configuration having N input channels and N−1 rows of building blocks, for sequentially decorrelating each of the input signals from each other of the input signals to thereby yield a single filtered output signal;
wherein each row of building blocks has a first end building block which is fed originally by a main input channel and a last end building block opposite said first end building block, wherein each building block includes:
a local main input channel which receives a local main input signal,
a local auxiliary input channel which receives a local auxiliary input signal, and
a processing mechanism that calculates a complex adaptive weight and generates a local output signal, utilizing the complex adaptive weight;
wherein said last end building block supplies the local output signal to a separate local output channel for follow on processing,
wherein said complex adaptive weight comprises: a sample median value of a real part of a ratio of a main input weight training data signal to an auxiliary input weight training data signal, and a sample median value of an imaginary part of the ratio of a main input weight training data signal to the auxiliary input weight training data signal.

17. An adaptive signal processing system as in claim 16, wherein the Nth input channel is supplied for follow on processing.

18. An adaptive signal processing system for receiving a of plurality input signals corresponding to a common target signal and for sequentially decorrelating the input signals to cancel the correlated noise components therefrom, the adaptive signal processing system comprising:
a plurality of building blocks arranged in a cascaded configuration having N input channels and N−1 rows of building blocks for sequentially decorrelating in each of the input signals from each other of the input signals to thereby yield a single filtered output signal;
wherein each row of building blocks has a first end building block which is fed originally by a main input channel and a last end building block opposite said first end building block,
wherein each building block includes:
a local main input channel which receives a local main input signal,
a local auxiliary input channel which receives a local auxiliary input signal, and
a processing mechanism that calculates a complex adaptive weight and generates a local output signal, utilizing the complex adaptive weight;
wherein said last end building block supplies the local output signal to a separate local output channel for follow on processing,
wherein said complex adaptive weight comprises a sample median value of a real part of a ratio of a main input weight training data signal to an auxiliary input weight training data signal.

19. An adaptive signal processing system for receiving a plurality input signals corresponding to a common target signal and for sequentially decorrelating the input signals to cancel the correlated noise components therefrom, the adaptive signal processing system comprising:
a plurality of building blocks arranged in a cascaded configuration having N input channels and N−1 rows of building blocks, for sequentially decorrelating each of the input signals from each other of the input signals to thereby yield a single filtered output signal;
wherein each row of building blocks has a first end building block which is fed originally by a main input channel and a last end building block opposite said first end building block,
wherein each building block includes:
a local main input channel which receives a local main input signal,
a local auxiliary input channel which receives a local auxiliary input signal, and
a processing mechanism that calculates a complex adaptive weight and generates a local output signal, utilizing the complex adaptive weight;
wherein said last end building block supplies the local output signal to a separate local output channel for follow on processing,
wherein said complex adaptive weight $w_{med}$ is calculated according to $$w_{med} = \mathop{MED}_{k=1 \text{ to } K}\left[\text{real}\left(\frac{z(k)^*}{x(k)^*}\right)\right] + j\left\{\mathop{MED}_{k=1 \text{ to } K}\left[\text{imag}\left(\frac{z(k)^*}{x(k)^*}\right)\right]\right\},$$

where K is the number of weight training data samples, z is the local main input signal, j is the unit imaginary number, and x is the local auxiliary input signal; and the local output signal r is generated by solving $$r = z - w^*_{med} x.$$

20. An adaptive signal processing method comprising:
receiving a plurality of input signals;
at least once inputting the input signals into a plurality of building blocks arranged in a cascade configuration;
sequentially approximately decorrelating each of the input signals from each other of the input signals; and
generating a filtered output signal;
wherein said decorrelating includes each building block generating a complex adaptive weight $w_{med}$ by calculating a sample median value of a ratio of a main input weight training data signal to an auxiliary input weight training data signal and generating a local output signal utilizing the complex adaptive weight,
each building block including a local main input channel which receives a local main input signal, a local auxiliary input channel which receives a local auxiliary input signal, and a processing mechanism that calculates the complex adaptive weight and generates the local output signal utilizing the complex adaptive weight.

21. A method according to claim 20, wherein at least one input signal comprises a common target signal or the output signal of the processing mechanism.

22. An adaptive signal processing method comprising:
receiving a plurality of input signals;
at least once inputting the input signals into a plurality of building blocks arranged in a cascade configuration;
sequentially approximately decorrelating each of the input signals from each other of the input signals; and
generating a filtered output signal;
wherein said decorrelating includes each building block generating a complex adaptive weight $w_{med}$ according to $$w_{med} = \mathop{MED}_{k=1 \text{ to } K}\left[\text{real}\left(\frac{z(k)^*}{x(k)^*}\right)\right] + j\left\{\mathop{MED}_{k=1 \text{ to } K}\left[\text{imag}\left(\frac{z(k)^*}{x(k)^*}\right)\right]\right\}$$

and generating a local output signal utilizing the complex adaptive weight,
each building block including a local main input channel which receives a local main input signal, a local auxiliary input channel which receives a local auxiliary input signal, and a processing mechanism that calculates the complex adaptive weight and generates the local output signal utilizing the complex adaptive weight, where K is the number of weight training data samples, z is the local main input signal, j is the unit imaginary number, and x is the local auxiliary input signal.

* * * * *